(12) United States Patent
Meadows

(10) Patent No.: US 7,802,594 B1
(45) Date of Patent: Sep. 28, 2010

(54) TREE TRIMMER

(76) Inventor: William H. Meadows, P. O. Box 254, Troy, AL (US) 36081

( * ) Notice: Subject to any disclaimer, the term of this patent is extended or adjusted under 35 U.S.C. 154(b) by 166 days.

(21) Appl. No.: 12/228,847

(22) Filed: Aug. 18, 2008

(51) Int. Cl.
*A01G 23/083* (2006.01)
(52) U.S. Cl. .................. 144/338; 144/4.1; 144/24.13
(58) Field of Classification Search ............ 144/4.1, 144/24.13, 208.1, 208.2, 208.6, 335, 338, 144/340
See application file for complete search history.

(56) References Cited

U.S. PATENT DOCUMENTS

| 2,707,007 | A | * | 4/1955 | Shuff | ............... 144/208.2 |
| 2,989,097 | A | | 6/1961 | Bombardier | |
| 3,183,952 | A | | 5/1965 | Larson | |
| 3,533,458 | A | * | 10/1970 | McColl | ............... 144/337 |
| 3,620,273 | A | * | 11/1971 | Propst et al. | ............... 144/4.1 |
| 3,651,845 | A | * | 3/1972 | Propst | ............... 144/4.1 |
| 3,704,733 | A | * | 12/1972 | McColl | ............... 144/24.13 |
| 3,708,000 | A | | 1/1973 | Duffty et al. | |
| 3,809,134 | A | | 5/1974 | McCabe | |
| 4,050,486 | A | | 9/1977 | Whitcomb | |
| 4,269,241 | A | * | 5/1981 | Hickman | ............... 144/24.13 |
| 4,522,239 | A | | 6/1985 | Gaitten | |
| 4,620,578 | A | | 11/1986 | Verrill et al. | |
| 4,781,228 | A | | 11/1988 | Vaders | |
| 4,815,506 | A | | 3/1989 | Kainz | |
| 5,322,102 | A | | 6/1994 | Livingston | |
| 6,474,377 | B1 | * | 11/2002 | Van De Mortel | ......... 144/24.13 |
| 2007/0095430 | A1 | * | 5/2007 | Uebergang | ............... 144/208.2 |

* cited by examiner

*Primary Examiner*—Shelley Self
(74) *Attorney, Agent, or Firm*—George L. Williamson

(57) ABSTRACT

Apparatus and method for trimming pine trees. The device comprises an enclosure having a pair of cutter heads mounted thereon each cutter head a pair of jaws having cutting blades thereon which jaws surround the trunk of the pine tree and then delimb the pine tree as the enclosure is moved up and down the pine tree by being placed on the front of a motorized skid steer loader/lift. The enclosure contains an air compressor driven by an internal combustion engine which supplies air for conveyance to air cylinders operated by a solenoid which cause the cutter head blades to operate. The enclosure can be moved about easily and conveniently by being mounted on the front of the motorized lift such as a caterpillar or forklift-type device.

18 Claims, 4 Drawing Sheets

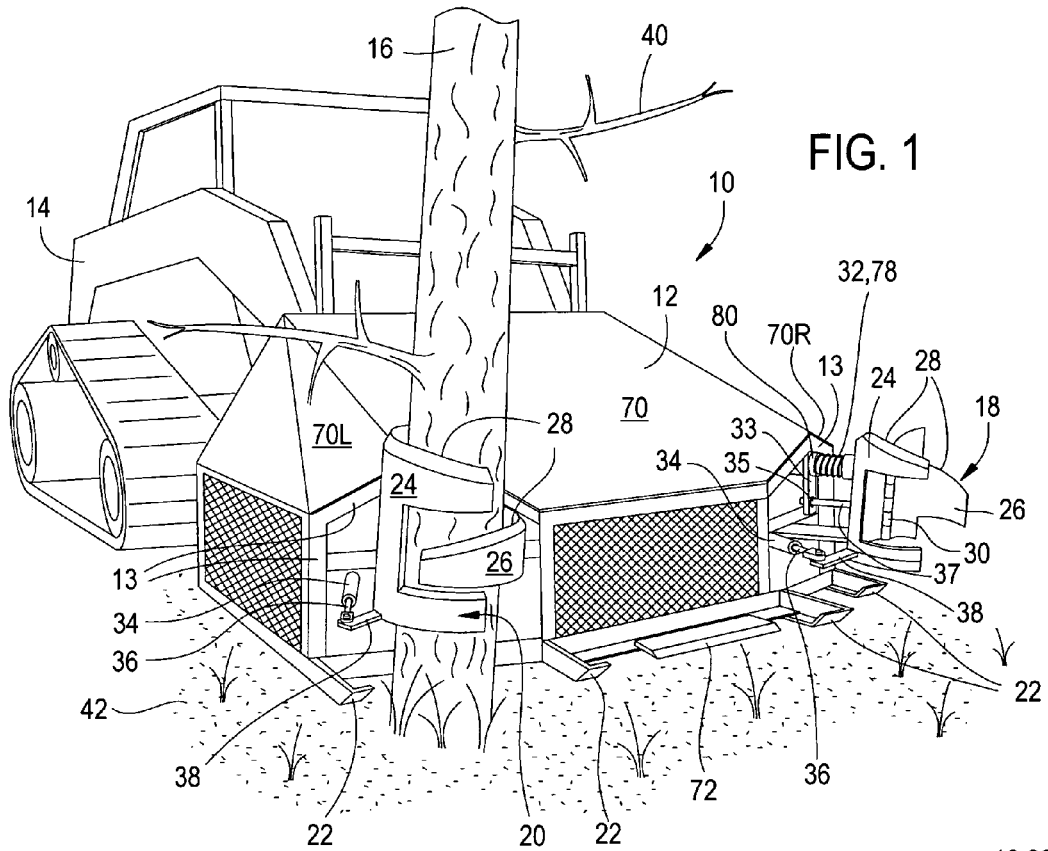
FIG. 1
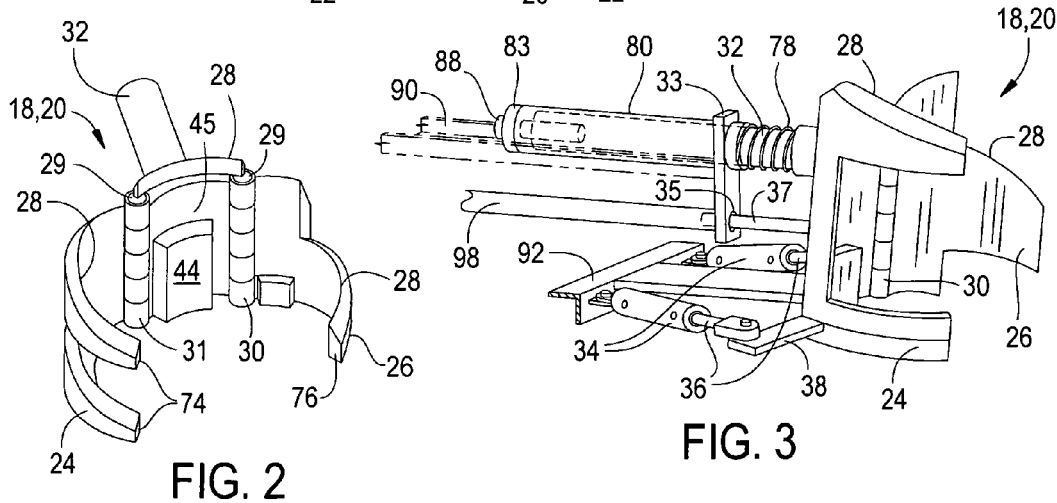
FIG. 2
FIG. 3

TREE TRIMMER

BACKGROUND OF THE INVENTION

1. Field of the Invention

The present invention relates generally to agricultural pruning devices and, more particularly, is concerned with a tree trimmer particularly designed to trim pine trees.

2. Description of the Prior Art

Methods and devices for tree trimmers have been described in the prior art, however, none of the prior art devices disclose the unique features of the present invention.

In U.S. Pat. No. 3,809,134 dated May 7, 1974, McCabe disclosed a device for delimbing trees. In U.S. Pat. No. 2,989,097 dated Jun. 20, 1961 Bombardier disclosed tree delimbing jaws. In U.S. Pat. No. 4,781,228 dated Nov. 1, 1988, Vaders disclosed a tree trimmer. In U.S. Pat. No. 5,322,102 dated Jun. 21, 1994, Livingston disclosed a trimming apparatus having a helical cutting head. In U.S. Pat. No. 4,815,506 dated Mar. 28, 1989, Kainz disclosed a tree harvesting and logging system. In U.S. Pat. No. 4,050,486 dated Sep. 27, 1977, Whitcomb disclosed an apparatus for delimbing trees. In U.S. Pat. No. 4,620,578 dated Nov. 4, 1986, Verrill, et al., disclosed a tree delimber. In U.S. Pat. No. 3,183,952 dated May 18, 1965, Larson disclosed a cammed blade cutter head for delimbing trees. In U.S. Pat. No. 3,708,000 dated Jan. 2, 1973, Duffty, et al., disclosed a method and apparatus for harvesting trees. In U.S. Pat. No. 4,522,239 dated Jun. 11, 1985, Gaitten disclosed a swath cutting and gripping tree delimber. While these tree delimbers may be suitable for the purposes for which they were designed, they would not be as suitable for the purposes of the present invention as hereinafter described.

SUMMARY OF THE PRESENT INVENTION

The present invention discloses an apparatus and method for trimming pine trees. The device comprises an enclosure having a pair of cutter heads mounted thereon each cutter head a pair of jaws having cutting blades thereon which jaws surround the trunk of the pine tree and then delimb the pine tree as the enclosure is moved up and down the pine tree by being placed on the front of a motorized skid steer loader/lift. The enclosure contains an air compressor driven by an internal combustion engine which supplies air for conveyance to air cylinders operated by a solenoid which cause the cutter head blades to operate. The enclosure can be moved about easily and conveniently by being mounted on the front of the motorized lift such as a caterpillar or forklift-type device.

An object of the present invention is to provide a device which can easily trim a pine tree. A further object of the present invention is to provide a device for being easily and quickly moved about in a forest of pine trees so as to accelerate the process of delimbing a forest of trees. A further object of the present invention is to provide a device having a left and right cutter head so that trees to the left or right of the center lane can be quickly accessed as the device moves along the lane between the rows of trees planted in the forest. A further object of the present invention is to provide a trimmer which can be easily used by the user. A further object of the present invention is to provide a trimmer which can be easily and relatively cheaply manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view showing the present invention in operative connection.

FIG. 2 is a perspective view of a cutter head of the present invention.

FIG. 3 is a perspective view of a cutter head of the present invention.

LIST OF REFERENCE NUMERALS

Figure 4:
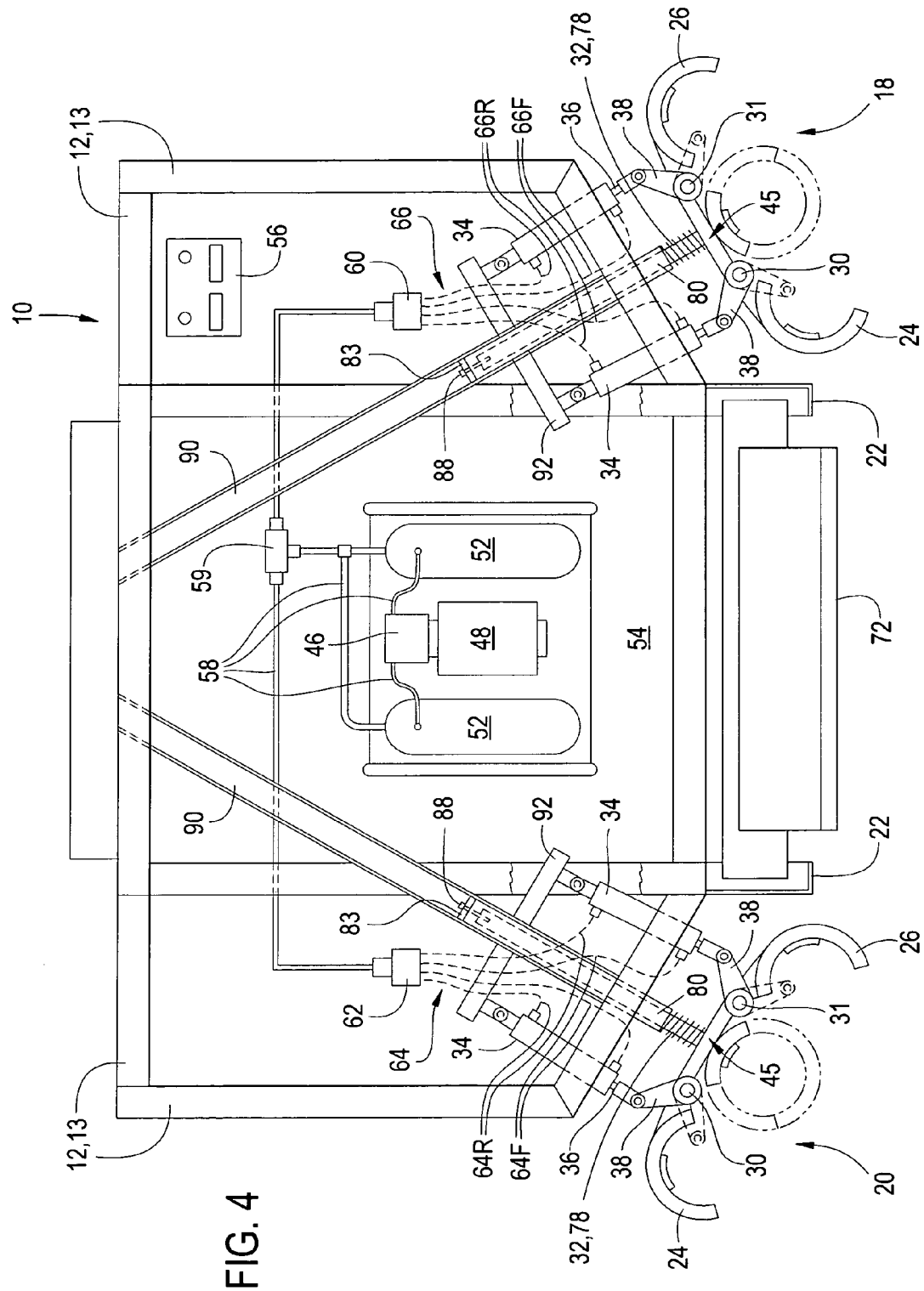
FIG. 4 is a plan view of the present invention.

With regard to reference numerals used, the following numbering is used throughout the drawings.

| | |
|---|---|
| 10 | present invention |
| 12 | enclosure/housing |
| 13 | frame member |
| 14 | motorized vehicle |
| 16 | tree |
| 18 | first cutter head |
| 20 | second cutter head |
| 22 | skid |
| 24 | first jaw |
| 26 | second jaw |
| 28 | cutting edge of blade |
| 29 | hinge pin |
| 30 | first hinge |
| 31 | second hinge |
| 32 | mounting shaft |
| 33 | mounting bracket |
| 34 | pneumatic cylinder |
| 35 | aperture |
| 36 | pneumatic arm |
| 37 | stabilizer rod |
| 38 | arm |
| 40 | limb |
| 42 | ground surface |
| 44 | spacer plate |
| 45 | base |
| 46 | air compressor |
| 48 | internal combustion engine |
| 50 | first air tank |
| 52 | second air tank |
| 54 | base |
| 56 | battery |
| 58 | air line |
| 59 | T-connector |
| 60 | first solenoid |
| 62 | second solenoid |
| 64 | conduit |
| 64F | front conduits |
| 64R | rear conduits |
| 66 | conduit |

| | |
|---|---|
| 66F | front conduits |
| 66R | rear conduits |
| 68 | universal mounting adapter |
| 69 | universal mount |
| 70 | top hood of enclosure |
| 70L | left side hood |
| 70R | right side hood |
| 72 | front cutter blade |
| 74 | fingers |
| 76 | fingers |
| 78 | coil spring |
| 80 | housing/tubing |
| 82 | wire |
| 83 | cap |
| 84 | switch |
| 86 | switch |
| 88 | bolt |
| 90 | channel |
| 92 | cross member |
| 94 | air exhaust |
| 96 | air inlet |
| 98 | tubing |

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1-8 illustrate the present invention wherein a device for trimming pine trees is disclosed.

Turning to FIG. 1, therein is shown the present invention 10 along with an enclosure/housing 12 which is mounted on the front end of a motorized vehicle 14, such as a caterpillar, forklift or skid steer loader, along with a tree 16 wherein the pair of cutter heads 18, 20 are mounted on the front of the enclosure. The enclosure has surrounding multiple structural steel frame members, e.g., 13, along with a top hood 70 and two additional side hoods, 70L on the left, 70R on the right, and bottom, front, rear, and left and right sides. Each cutter head 18, 20 has a first jaw member 24 and a second jaw member 26, each having cutting edges or blades 28 formed on their upper portions wherein the jaws 24, 26 wrap around the tree 16 and are then moved up the tree so as to trim the branches 40 away from the tree so as to delimb the tree. The enclosure 12 has a plurality of skid members 22 mounted on its bottom surface so that the enclosure can be easily moved about and so that it can slide along the surface of the ground without digging into the ground surface 42. Also shown is one of a pair of the hinges 30 of the jaws 18, 20, each of which are mounted on a shaft 32 having a coil spring 78 thereon. The jaws each have a protrusion or arm 38 thereon which connect to the arm 36 of the pneumatic cylinder 34 so as to connect the pneumatic cylinder to the protruding arm 38. Also shown is a front cutter blade 72 used for cutting rouge trees that grow in the lanes between the planted pine trees 16. Also shown is mounting bracket 33 having a two-inch aperture 35 therein for receiving a one-inch stabilizer rod 37 therein and tubing 80 which houses shaft 32. Means for mounting the heads 18, 20 to the enclosure 12 are provided by shafts 32. Means for opening and closing the jaws 24, 26 are provided by cylinders 34.

Turning to FIG. 2, therein is shown one of the identical, interchangeable cutter heads being representative of 18, 20 having a first jaw 24 having upper and lower fingers 74 and a second jaw 26 having a single finger 76 thereon, each jaw being operated on a hinge 30, 31 wherein the cutter head is mounted on a mounting shaft 32 so that when the jaws close the finger 76 is disposed between the pair of fingers 74 to allow the tree to be securely captured between the jaws 24, 26 as best seen in FIG. 1. Mounting shaft 32 is connected to the rear side of central base 45 of the cutter head 18, 20. The inside of the cutter head 18, 20 has a ½" spacer plate 44 welded onto the front of the base 45 which plate is designed to hold the sharp edges of the jaws 24, 26 away from the bark of the tree. Plates 44 have to be beveled on the edges for sliding or they will damage the bark of the tree. Also shown are the cutting edges 28 of the jaws 24,26 and top of cutter head 18, 20. Both cutter heads 18, 20 are fashioned from 8-inch metal pipe with slanted and beveled edges 28. The hinges 30, 31 are disposed on each edge of base 45 and are made from one inch seamless pipe with five pieces being cut two inches long with every other one welded to the central base piece 45 and the outer two being welded to the wing pieces 24, 26. A 10-inch long, one-inch cold roll rod is used for the hinge pins 29. Grease fittings are on the back of the hinges 30, 31.

Turning to FIG. 3, therein is shown one of the identical cutter heads 18, 20 which are mounted on each side of the enclosure. Each cutter head 18, 20 has jaw members 24, 26 having cutting edges 28 thereon. Also shown is one of a pair of hinges 30 of jaw 18, 20, each of which are mounted on a shaft 32 having a coil spring 78 thereon. The jaws each have a protrusion or arm 38 thereon which connect to the arm 36 of the pneumatic cylinder 34 so as to connect the pneumatic cylinder to the arm 38. Also shown is a mounting bracket 33 having aperture 35 therein opening into tubing 98 for receiving a stabilizer rod 37 therein along with tubing 80 which houses shaft 32. Tubing 80 has a cap 83 on its end having a bolt 88 which connects the cap to the mounting shaft 32. Tubing 80 is mounted into a three-inch channel 90 which is connected to the frame as will be disclosed later. Mounting bracket 33 is connected to a frame member of the enclosure as previously described. The cutter heads 18, 20 can be easily removed from the present invention 10 by unscrewing and removing bolt 88 and removing cap 83 which frees the mounting shaft 32 so that the cutter heads can be removed from the tubing 80 after disconnection of any lines connecting to the pneumatic cylinders 34. The rear end of each of the pneumatic cylinders 34 connect to cross member 92.

Turning to FIG. 4, therein is shown the present invention 10 along with enclosure/housing 12 and multiple frame members 13 wherein the pair of cutter heads 18, 20 are mounted on the front of the enclosure at an angle of about thirty degrees away, i.e., laterally, from a center line connecting the midpoint of the front and rear sides of the enclosure. Each head 18, 20 has a first jaw member 24 and a second jaw member 26. The enclosure 12 has a plurality of skid members 22 and front blade 72. Also shown are the hinges 30, 31 of the heads 18, 20, each of which are mounted to the housing 12 by means of shaft 32. The base of each head 18, 20 is mounted on a two inch cold roll shaft 32 being about 22" long with holding caps 83 bolted at 88 into the ends of each shaft for easy removal from housing/tubing 80. Each cutter head shaft 32 is mounted internal a two inch pipe housing/tubing 80 being about 18" long which is greased allowing the heads 18, 20 to pivot twenty degrees clockwise or counterclockwise and also retract two inches to eliminate damage to tree bark. The two inches of retraction are possible because the cylinders 34, arms 36 and heads 18, 20 share a common mounting frame cross member 92 underneath the shaft housing 80. A one-inch cold roll stabilizer rod (not shown but see Item 37 of FIG. 3) is mounted under the two-inch shaft 32 which stabilizer rod is free to pivot inside a two-inch pipe having an aperture therein (not shown but see Item 35 of FIG. 3) to allow the heads 18, 20 to pivot approximately 20 degrees needed so as not to damage the tree bark. A four inch long 2⅛" inner diameter coil spring 78 being outwardly biased allows the heads 18, 20 to retract and then re-extend the needed two inches. Arm 38 is also shown. The jaws each have a protrusion or arm 38 thereon which connect to the arm 36 of the pneumatic cylinder 34 so as to connect the pneumatic cylinder to the arm 38. Tubing 80 has a cap 83 on its rear end having a bolt 88 which connects the cap to the mounting shaft 32. Tubing 80 is mounted into a three-inch channel 90 which is connected to the rear of the frame 13. The cutter heads 18, 20 can be easily removed from the present invention 10 by unscrewing bolt 88 and removing cap 83 which frees the mounting shaft 32 so that the cutter heads can be removed from the present invention after disconnection of any lines connecting to the pneumatic cylinders 34. Also shown is an air compressor 46 (which may be portable) mounted onto the base or floor 54 of the enclosure 12 and driven by an internal combustion engine 48 which forces air through a conduit into a pair of air cylinders 50, 52 which are mounted under and behind the cutter heads 18, 20. Also shown is a 12 volt battery 56 or power supply which supplies electricity to a pair of solenoids 60, 62 which control the corresponding pneumatic cylinders 34 that open and close the cutter heads 18, 20. Also shown are air lines 58 and "T" connector 59 which conveys air from the air cylinders 50, 52 to a first solenoid 60 and a second solenoid 62. Also shown are air conduit lines 64, 66 wherein these conduits connect the solenoids 60, 62 to the respective pneumatic cylinders 34 which then operate the cutter heads 18, 20. Solenoids 60, 62 are connected in a push/pull configuration with the pneumatic cylinders 34 so that the pair of lines (denoted as 64R and 66R) of the groups 64, 68 toward the rear of the air cylinders 34 open the cylinders so as to extent arm 36 and thus to close the heads 18, 20 around a tree; when the pair of lines (denoted as 64F and 66F) on the front of the cylinders 34 open and the rear air lines close, then the cylinders retract and thereby open the heads so that the heads are released from a tree. The portable air compressor 46 for air supply is mounted with one roll clip pin on each side so it can be removed from the enclosure 12 for repairs and also it is allowed to sit freely on its own vibration pads wherein it supplies 120 lbs. of air pressure continuously easily supplying the 75 lbs. of pressure needed to operate the cutter heads 18, 20. The 12-volt battery 56 supplies voltage to the solenoids 60, 62 which activate the cylinders 34 that close and open the cutter heads 18, 20. The electrical connections will be described in FIG. 8. Four air cylinders 34 being 1¼" diameter with a four inch stroke move the cutter heads 18, 20 in and out for the wrap around the trees. Each cutter head 18, 20 is controlled independent of the other with its own trigger switch. About a maximum of 75 lbs. air pressure is required for combined tension and cushion to remove limbs without damaging tree bark. Each head 18, has a 12V solenoid 60, 62 which activates the air cylinders 34 wherein each head has two cylinders that receive air from a T-line 58 coming off the compressor 46.

Figure 5:
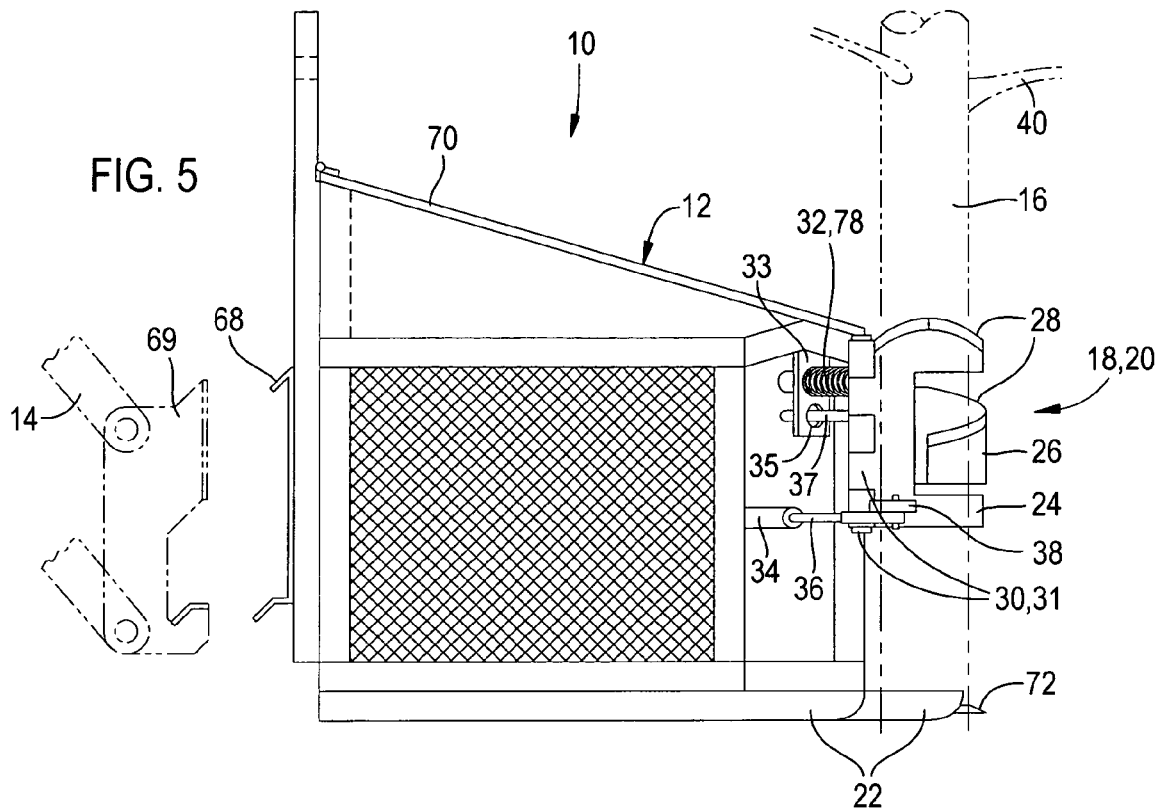
FIG. 5 is a side elevation view of the present invention.

Turning to FIG. 5, therein is shown the present invention 10 along with an enclosure 12 which is mounted on the front end of a motorized vehicle 14, such as a caterpillar, forklift or skid steer loader, along with a tree 16 wherein the pair of cutter heads 18, 20 are mounted on the front of the enclosure. The rear of the enclosure 12 is adapted at 68 for connection onto a universal mount 69 on the front of the motorized vehicle 14. The enclosure has a top hood 70 and two more side hoods and bottom, a front, rear, and left and right sides. Each cutter head 18, 20 has a first jaw member 24 and a second jaw member 26, each having cutting edges or blades 28 formed on their upper portions wherein in the jaws 24, 26 wrap around the tree 16 and are then moved up the tree so as to trim the branches 40 away from the tree so as to delimb the tree. The enclosure 12 has a plurality of skid members 22 mounted on its bottom surface so that the enclosure can be easily moved about and so that it can make contact with the ground without digging into the ground but rather to slide along the surface of the ground. Also shown is one of a pair of the hinges 30, 31 of the jaws 18, 20, each of which are mounted on a shaft 32 with spring 78 thereon. The jaws each have a protrusion 38 thereon which connect to the arm 36 of the pneumatic cylinder 34 so as to connect the pneumatic cylinder to the protrusion/arm 38. Also shown is a front cutter blade 72 used for cutting rouge trees that grow in the lanes between the planted pine trees 16. Mounting bracket 33 connected to the frame of housing 12 and stabilizer rod 37 in aperture 35 are also shown.

Figure 6:
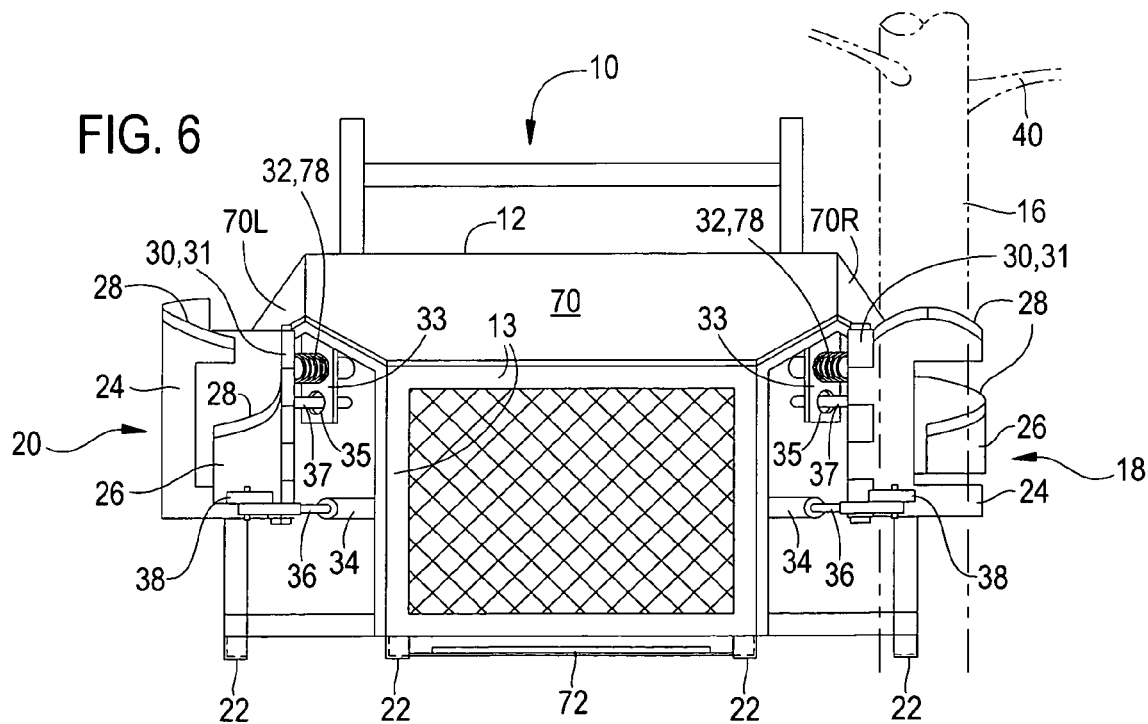
FIG. 6 is a front elevation view of the present invention.

Turning to FIG. 6, therein is shown the present invention 10 along with an enclosure 12 along with a tree 16 wherein the pair of cutter heads 18, 20 are mounted on the front of the enclosure. The enclosure has a top hood 70 and two more side hoods 70L, 70R and bottom, a front, rear, and left and right sides. Top hood 70 and the side hoods allow access into the interior of the enclosure. Each cutter head 18, 20 has a first jaw member 24 and a second jaw member 26, each having cutting edges or blades 28 formed on their upper portions wherein in the jaws 24, 26 wrap around the tree 16 and are then moved up the tree so as to trim the branches 40 away from the tree so as to delimb the tree. The enclosure 12 has a plurality of skid members 22 mounted on its bottom surface so that the enclosure can be easily moved about and so that it can make contact with the ground without digging into the ground but rather to slide along the surface of the ground. Also shown is one of a pair of the hinges 30, 31 of the jaws 18, 20, each of which are mounted on a shaft 32 with spring 78 thereon. The jaws each have a protrusion 38 thereon which connect to the arm 36 of the pneumatic cylinder 34 so as to connect the pneumatic cylinder to the protrusion 38. Also shown is a front cutter blade 72 used for cutting rouge trees that grow in the lanes between the planted pine trees 16. Mounting bracket 33 connected to the frame of housing 12 and stabilizer rod 37 in aperture 35 are also shown.

Figure 7:
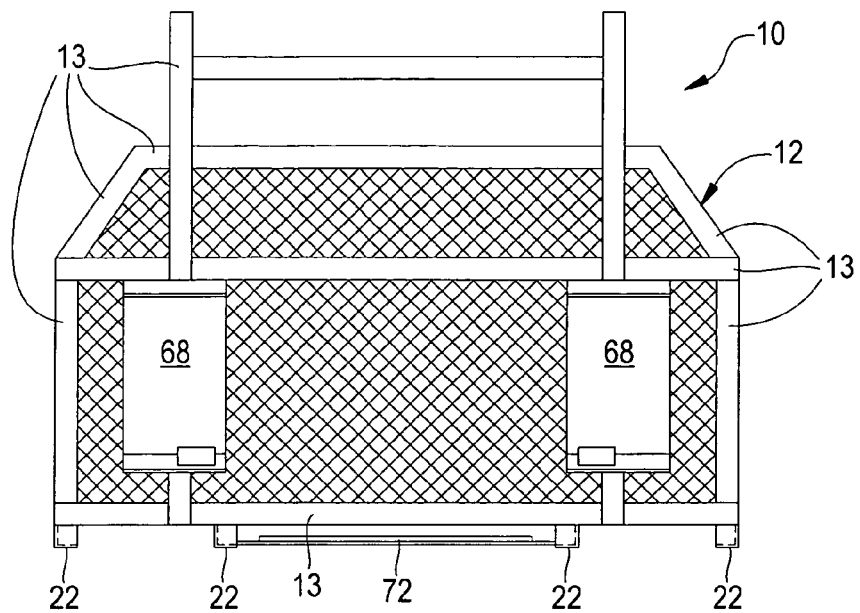
FIG. 7 is a rear elevation view of the present invention.

Turning to FIG. 7, therein is shown the enclosure 12 with multiple frame members 13 of the present invention 10 having the skids 22 on its lower surface along with universal mounting means 68 connected to the frame members which are used to connect and mount the enclosure 12 on the front end of the carrying motorized vehicle.

Figure 8:
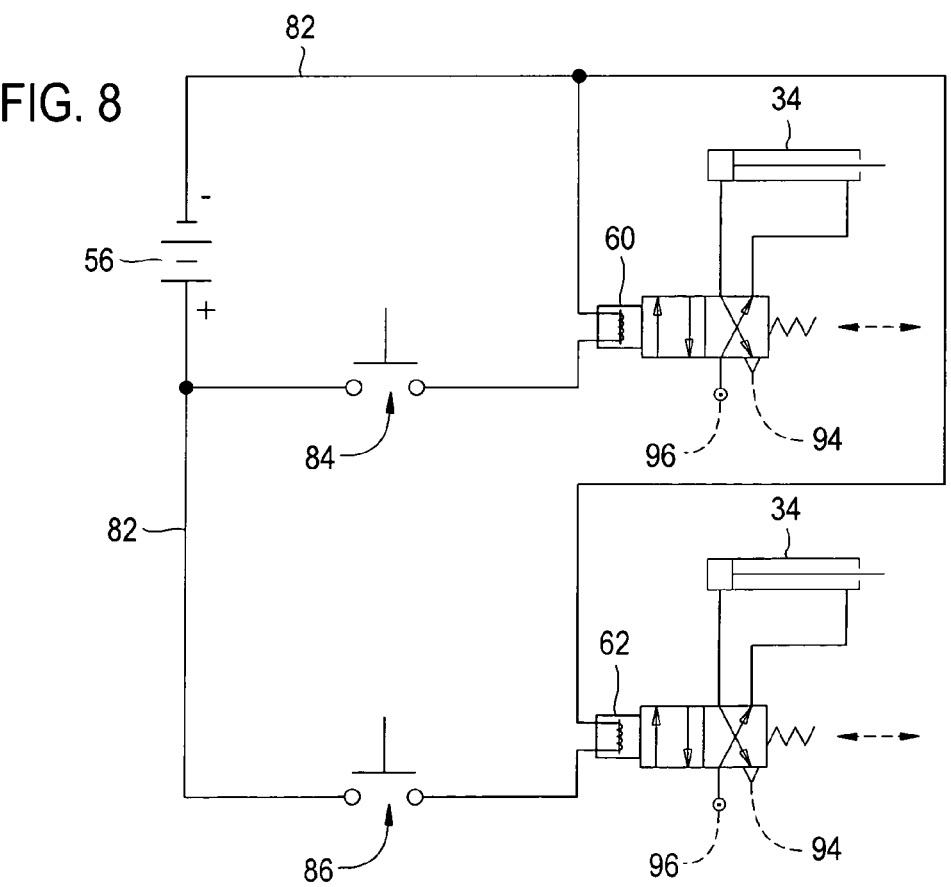
FIG. 8 is a schematic drawing of portions of the present invention.

Turning to FIG. 8, therein is shown an exemplary electrical schematic of the present invention. The 12-volt battery 56 supplies voltage to the solenoids 60, 62 which activate the cylinders 34 that close and open the cutter heads. An electrical connecting wire 82 connects to the loader steering levers where the trigger switches 84, 86 for the cylinders 34 and cutter heads are mounted. Each cylinder 34 is controlled independent of the other with its own trigger switch 84, 86. About a maximum of 75 lbs. air pressure is required for combined tension and cushion to remove limbs without damaging tree bark. Each cylinder 34 has a 12V solenoid 60, 62 which activates/controls the air cylinders 34 wherein each head has two cylinders that receive air from a T-line coming off the compressor. By way of an example of operation, the cylinders 34 are normally retracted so that the cutter heads (see Item 18, 20 of FIG. 3) are normally open when switch 84, 86 are also normally open; when either switch 84, 86 are pressed then the corresponding cylinder 34 extends thereby closing the cutter heads around a tree. When the solenoids close (retract) the cylinders, air is exhausted from the cylinders to the atmosphere at 94. Air enters the solenoids at 96.

I claim:

1. An apparatus for removing limbs from the trunk of a tree, the apparatus being mounted on a motorized vehicle, comprising:
   a) a housing, said housing being supported by a plurality of frame members, said housing having a front, rear, top, bottom, and first and second sides, said housing being attachable to and removable from the motorized vehicle so that said housing is raised or lowered by the motorized vehicle;
   b) a first and second cutter head being disposed on said front of said housing, a first and second jaw being disposed on each said cutter head, each said saw having an upper edge thereon, a cutting blade being disposed on said upper edge of each said first and second jaw, wherein each said jaw is movable between an open position and a closed position, wherein when each said jaw is in said closed position the tree to be delimbed is captured between said first and second jaw so that the limbs are cut from the trunk of the tree by said cutting blade as the housing is raised up the trunk of the tree by the motorized vehicle;
   c) means for mounting said first and second cutter head on said housing to permit each said cutter head to be attached to and removed from the housing; and,
   d) means for moving said first and second jaws from said open position to said closed position; and
   e) said means for mounting each said first and second cutter head on said housing further comprises:
      i) a mounting shaft having first and second ends, wherein said first end of said mounting shaft is adapted for connection to said cutter head, wherein said second end of said mounting shaft is adapted for being connected to and removed from said housing, wherein said mounting shaft is substantially horizontally disposed;
      ii) wherein said mounting shaft is adapted for movement along an axis thereof so that said cutter head is movable along said axis of said mounting shaft a distance of about two inches so that the trunk of the tree is not damaged from contact with said cutter head as said cutter head is raised up the trunk of the tree; and,
      iii) wherein said mounting shaft is rotatable about said axis thereof about twenty degrees clockwise or counterclockwise so that the trunk of the tree is not damaged from contact with said cutter head as said cutter head is raised us the trunk of the tree.

2. The apparatus of claim 1, wherein said means for moving each said first and second jaw from said open position to said closed position further comprises:
   a) a pneumatic cylinder having first and second ends, wherein said first end of said pneumatic cylinder is adapted for connection to said jaw;
   b) a cross member being disposed on each said cutter head; and,
   c) wherein said second end of said pneumatic cylinder is adapted for being commuted to said cross member.

3. The apparatus of claim 2, further comprising a coil spring being disposed adjacent said first end of said mounting shaft so as to bias each said cutter head away from said housing.

4. The apparatus of claim 3, further comprising a stabilizer rod being disposed on each said cutter head so as to allow said mounting shaft to rotate a maximum of about twenty degrees.

5. The apparatus of claim 4, further comprising a base being disposed on each said first and second cutter head, said base having a top, bottom, first and second sides, and inner face, wherein said first jaw is hinged to said first side of said base and said second jaw is hinged to said second side of said base.

6. The apparatus of claim 5, further comprising a spacer being disposed on said inner face of said base so that the bark of a tree is nut damaged by said cutter head.

7. The apparatus of claim 6, further comprising an air compressor being disposed on said housing to permit air to be supplied to the pneumatic cylinders.

8. The apparatus of claim 7, further comprising a solenoid for controlling the flow of air to the pneumatic cylinders.

9. The apparatus of claim 8, further comprising a power supply and an electrical switch for controlling the operation of said solenoid.

10. An apparatus for removing limbs from the trunk of a tree, the apparatus being mounted on a motorized vehicle, composing:
   a) a housing, said housing being supported by a plurality of frame members, said housing having a front, rear, top, bottom, and first and second sides, said housing being attachable to and removable from the motorized vehicle so that said housing is raised or lowered by the motorized vehicle;
   b) a first and second cutter head being disposed on said front of said housing, a first and second jaw being disposed on each said cutter head, each said jaw having an upper edge thereon, a cutting blade being formed in said upper edge of each said first and second jaw, wherein each said jaw is movable between an open position and a closed position, wherein when each said jaw is in said closed position the tree to be delimbed is captured between said first and second jaw so that the limbs are cut from the trunk of the tree by said cutting blade as the housing is raised up the trunk of the tree by the motorized vehicle;
   c) means mounted on an inside of said cutter heads to hold sharp edges of said cutter blades away from bark of said tree trunk to as to prevent damage to said bark while delimbing said tree;
   d) means for mounting said first and second cutter head on said housing to permit each said cutter head to be attached to and removed from the housing; and,
   e) means for moving said first and second jaws from said open position to said closed position.

11. A method of delimbing a tree trunk comprising the steps of:
   a) maneuvering a motorized vehicle to said tree trunk, said motorized vehicle carrying a housing, said housing being supported by a plurality of frame members, said housing having a front, rear, top, bottom, and first and second sides, said housing being attachable to and removable from the motorized vehicle so that said housing is raised or lowered by the motorized vehicle, a cutter head disposed on said front of said housing, a cutter head having a set of first and second jaws, each said jaw having an upper edge thereon, a cutting blade formed in said upper edge of each of said first and second jaws, said jaws being movable between an open position and a closed position;

b) positioning said cutter head to where said tree trunk is between said first and second jaws in said open position;

c) actuating said jaws into said closed position wherein said jaws completely surround said tree trunk;

d) raising said cutter head whereby said cutting blade on each of said first and second jaws trims away branches on said tree trunk, said cutter head having means to hold said cutting blades away from bark of said tree trunk to as to prevent damage to said bark while delimbing said tree.

12. The method of claim 11, further comprising the steps of:

a) providing a pneumatic cylinder for each jaw, said cylinder having first and second ends, wherein the first end of each pneumatic cylinder is connected to one of said jaws for;

b) providing a cross member on each cutter head; and, c) wherein the second end of each pneumatic cylinder is connected to the cross member for moving the jaw back and forth between the open and closed positions.

13. The method of claim 11, wherein said motorized vehicle has two cutter heads, said cutter heads disposed at an angle of about thirty degrees apart laterally from a line connecting to a mid-point of front and rear sides of the housing.

14. The method of claim 11, in which said means to prevent damage to bark on said tree comprises a spacer plate mounted on a central base between said jaws, said spacer plate having beveled edges for sliding on said bark without damaging said bark.

15. The method of claim 14, further comprising the step of providing a stabilizer rod on each cutter head so as to allow a mounting shaft each set of jaws to rotate a maximum of about twenty degrees.

16. The method of claim 15, in which each jaw is hinged along opposite sides of the base.

17. The method of claim 16, further comprising the step of providing an air compressor on the housing to supply air to the pneumatic cylinders, providing a solenoid for controlling the flow of air to the pneumatic cylinders, and, a power supply and an electrical switch for controlling the operation of the solenoid.

18. The apparatus of claim 10, wherein each said first and second cutter head is disposed at an angle of about thirty degrees laterally from a line connecting to the mid-point of said front and rear sides of said housing.

* * * * *